US008820961B2

(12) United States Patent
Kim

(10) Patent No.: US 8,820,961 B2

(45) Date of Patent: Sep. 2, 2014

(54) LAMP FOR CAMERA-ATTACHABLE STREETLIGHT

(75) Inventor: Duk-Yong Kim, Gyeonggi-do (KR)

(73) Assignee: KMW Inc., Hwaseong, Gyeonggi-Do (KR)

(*) Notice: Subject to any disclaimer, the term of this patent is extended or adjusted under 35 U.S.C. 154(b) by 138 days.

(21) Appl. No.: 13/058,240

(22) PCT Filed: Sep. 11, 2008

(86) PCT No.: PCT/KR2008/005384

§ 371 (c)(1),
(2), (4) Date: Feb. 9, 2011

(87) PCT Pub. No.: WO2010/018887

PCT Pub. Date: Feb. 18, 2010

(65) Prior Publication Data

US 2011/0141727 A1 Jun. 16, 2011

(30) Foreign Application Priority Data

Aug. 11, 2008 (KR) ........................ 10-2008-0078606

(51) Int. Cl.

| | |
|---|---|
| ***F21V 33/00*** | (2006.01) |
| ***H04N 7/18*** | (2006.01) |
| ***G08B 15/00*** | (2006.01) |
| ***F21S 8/08*** | (2006.01) |
| ***G08B 13/196*** | (2006.01) |
| *F21Y 101/02* | (2006.01) |
| *F21S 2/00* | (2006.01) |
| *F21W 131/103* | (2006.01) |

(52) U.S. Cl.

CPC .............. *F21S 8/086* (2013.01); *F21Y 2101/02* (2013.01); *F21V 33/00* (2013.01); *G08B 15/001* (2013.01); *G08B 13/19632* (2013.01); *F21S 2/00* (2013.01); *F21W 2131/103* (2013.01)

USPC ............................ 362/234; 362/235; 348/143

(58) Field of Classification Search

CPC ............................. F21S 8/086; F21V 33/0052

See application file for complete search history.

(56) References Cited

U.S. PATENT DOCUMENTS

| | | | | |
|---|---|---|---|---|
| 6,324,311 | B1 * | 11/2001 | Gann | 348/E5.025 |
| 6,462,775 | B1 * | 10/2002 | Loyd et al. | 348/E7.087 |
| 6,812,970 | B1 * | 11/2004 | McBride | 348/372 |
| 7,350,936 | B2 | 4/2008 | Ducharme et al. | 362/231 |
| 7,825,602 | B2 * | 11/2010 | Hu et al. | 315/152 |
| 2003/0197807 | A1 * | 10/2003 | Wu | 348/375 |
| 2011/0134239 | A1 * | 6/2011 | Vadai et al. | 348/143 |

FOREIGN PATENT DOCUMENTS

| | | | |
|---|---|---|---|
| CN | 1622141 A | 6/2005 | |
| JP | 37-004183 Y | 3/1962 | |
| JP | 10-149720 | 6/1998 | F21V 33/00 |

(Continued)

*Primary Examiner* — Britt D Hanley

(74) *Attorney, Agent, or Firm* — Edwards Wildman Palmer LLP

(57) ABSTRACT

A lamp for a camera-attachable streetlight is provided, which includes a camera-integrated bulb module. In the camera-integrated bulb module, there is a bulb portion, a camera module has a camera for capturing a predetermined area and a transceiver for transmitting data captured by the camera to an external server, a connector is inserted into a commercial socket, for receiving an external commercial power and has the same structure as a commercial connector inserted into a commercial socket, for receiving a commercial power, and a power distributor distributes the power received through the connector to the bulb portion and the camera module.

16 Claims, 4 Drawing Sheets

(56) References Cited

FOREIGN PATENT DOCUMENTS

| | | | | |
|---|---|---|---|---|
| JP | 2002-251502 | | 9/2000 | G06F 17/60 |
| JP | 2004-112385 | A | 4/2004 | |
| JP | 2004-357125 | A | 12/2004 | |
| JP | 2007-158820 | A | 6/2007 | |
| JP | 3138227 | U | 12/2007 | |
| JP | 3138653 | U | 12/2007 | |
| KR | 20-0206220 | | 12/2000 | H04N 5/225 |
| KR | 20-0313825 | | 5/2003 | H04N 5/225 |
| KR | 20-2008-0000051 | | 1/2008 | F21S 13/02 |
| KR | 10-2009-0108959 | | 10/2009 | F21S 13/10 |
| KR | 20-2009-0011780 | | 11/2009 | F21S 13/10 |
| WO | WO 0223856 | A2 * | 3/2002 | |

* cited by examiner

LAMP FOR CAMERA-ATTACHABLE STREETLIGHT

CLAIM OF PRIORITY

The present application makes reference to and claims all benefits accruing under 35 U.S.C. Section 120 from a PCT/KR2008/005384 filed on Sep. 11, 2008, which claims a priority from an earlier application KPA 10-2008-0078606 filed with the Korean Intellectual Property Office on Aug. 11, 2008.

BACKGROUND OF THE INVENTION

1. Field of the Invention

The present invention generally relates to a streetlight. More particularly, the present invention relates to a lamp for a camera-attachable streetlight.

2. Description of the Related Art

In general, streetlights installed along a road illuminate their surrounding area at night by turning on and off at predetermined times using commercial power as a power supply source.

In view of installation along roads and use of commercial power, streetlights are added with surveillance cameras, for the purposes of traffic monitoring and security. For a surveillance system using a surveillance camera, see Korea Patent Application No. 2007-42804 entitled "Opening to the Public Radio Frequency it Operates Streetlamp Sticking Type the Road Surveillance With Life Crime Prevention System and the Operation Method which it Use" (filed on May 2, 2007. Assignee: Kumsung Security and Inventors: Mu-Kil Jung and Wan-Ju Song).

Installation of a surveillance camera to a streetlight requires an attaching device for attaching the body of the surveillance camera to the street. Also, to supply a commercial power as an operation power to the streetlight, an additional power cable is needed and the power supply configuration of the streetlight needs a modification. Therefore, the installation of the surveillance camera to the streetlight is rather difficult.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a lamp for a camera-attachable streetlight, which facilitates installation of a surveillance camera to the streetlight.

Another aspect of exemplary embodiments of the present invention provides a lamp for a camera-attachable streetlight, which enables installation of a surveillance camera to the streetlight such that power supply becomes easy.

In accordance with an aspect of exemplary embodiments of the present invention, there is provided a lamp for a camera-attachable streetlight, which includes a camera-integrated bulb module. In the camera-integrated bulb module, there is a bulb portion, a camera module has a camera for capturing a predetermined area and a transceiver for transmitting data captured by the camera to an external server, a connector is inserted into a commercial socket, for receiving an external commercial power and has the same structure as a commercial connector inserted into a commercial socket, for receiving a commercial power, and a power distributor distributes the power received through the connector to the bulb portion and the camera module.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
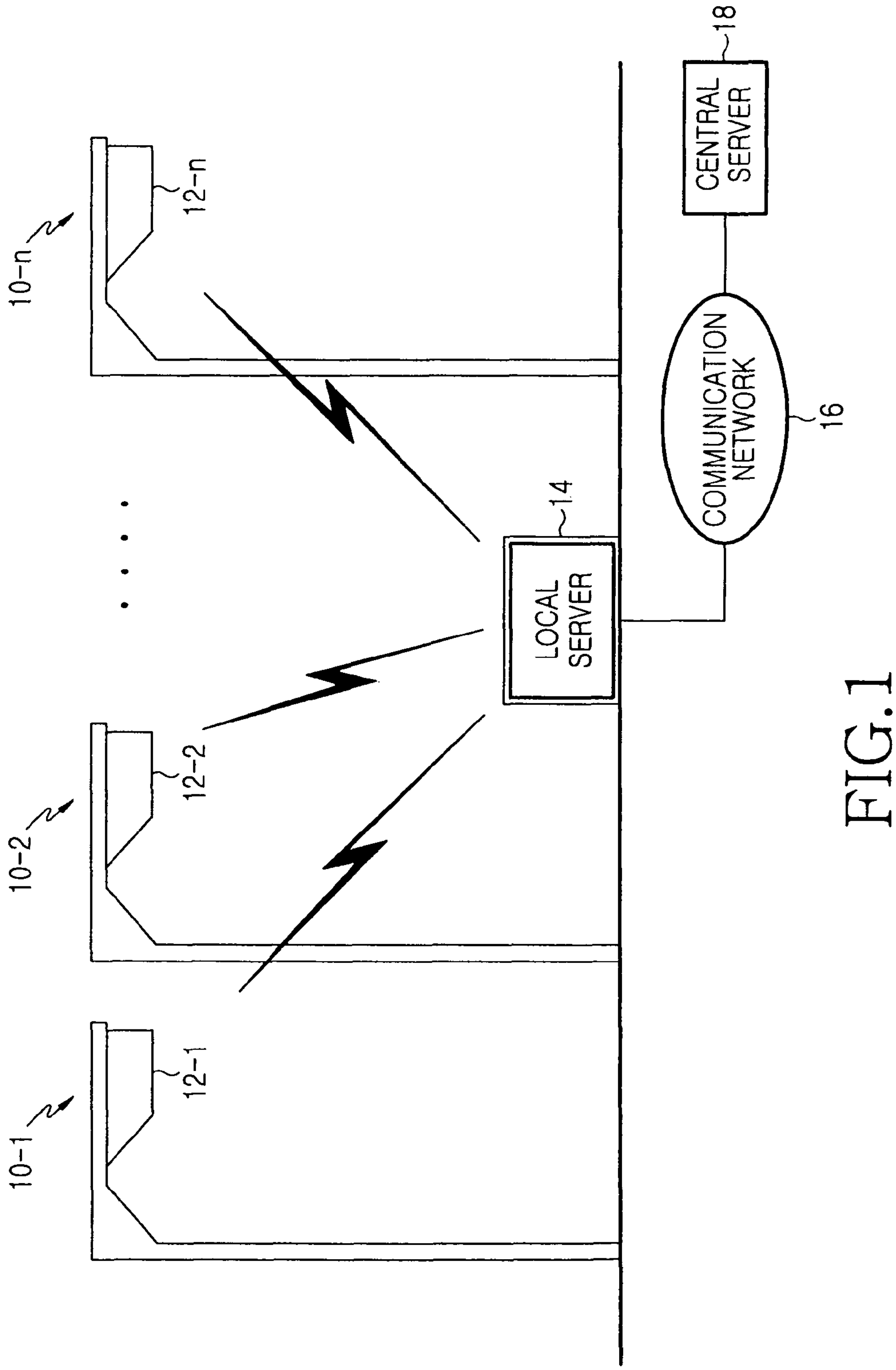
FIG. 1 is a block diagram of a surveillance system using a lamp of a camera-attachable streetlight according to an exemplary embodiment of the present invention.

FIG. 1 is a block diagram of a surveillance system using a lamp of a camera-attachable streetlight according to an exemplary embodiment of the present invention. Referring to FIG. 1, the surveillance system includes camera-integrated lamps 12-1 to **12-*n* installed to a plurality of streetlights 10-1 to 10-*n*. according to the present invention, each of the camera-integrated lamps 12-1 to 12-*n* includes a lighting bulb used in a typical streetlight lamp and a wireless camera module integrated with the lighting bulb and operating in a visible light range, for capturing its installation area and wirelessly transmitting captured data to a local server 14**.

The local server 14 temporarily stores the visible light-range captured data received wirelessly from the camera-integrated lamps 12-1 to **12-*n* on a camera basis and transmits them to a central server 18 over a communication network 16 such as a dedicated network or the Internet. The captured data from each camera includes an Identifier (ID) of the camera so that the captured data can be stored for the camera. While a single local server 14 is illustrated in FIG. 1**, it is a mere exemplary application and obviously, a local server should be installed for each appropriately defined area in real implementation.

The central server 18 stores the captured data received from the local server 14 and searches for and displays the captured data of a particular camera according to an operator's manipulation. The operator or a subscriber that has been registered to receive the service can access the central server

18 through a terminal (not shown) from a remote location and receive the data search and display service from the central server 18.

Figure 2:
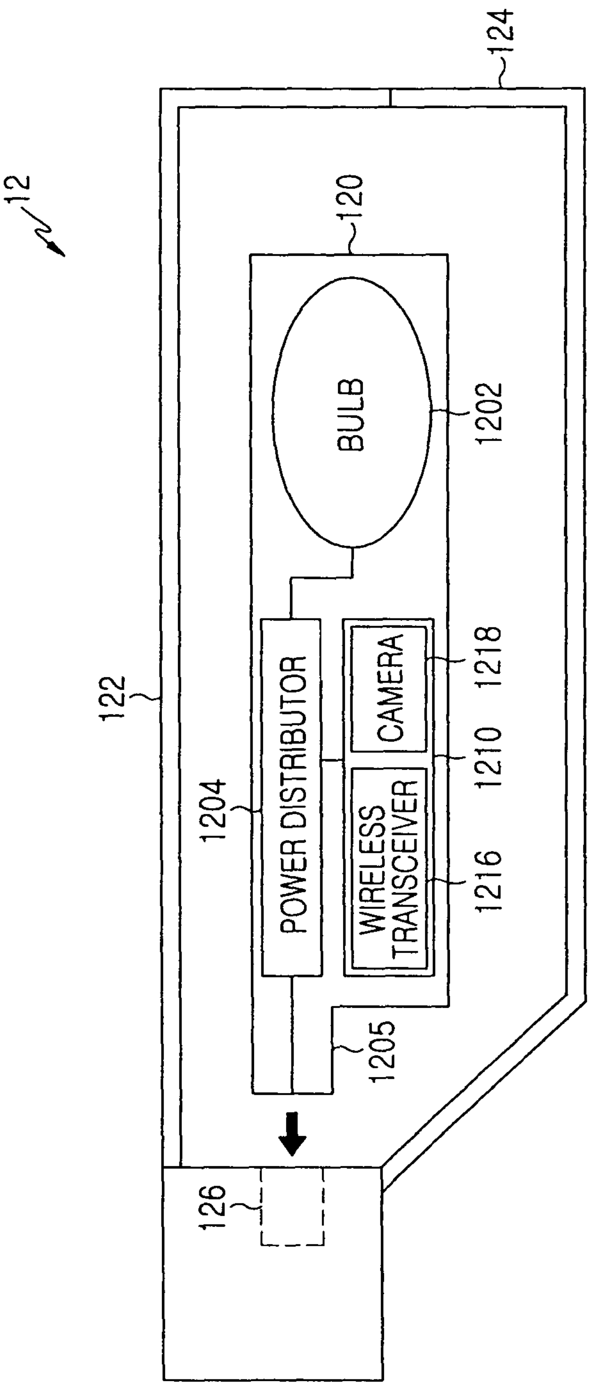
FIG. 2 is a block diagram of a lamp for a camera-attachable streetlight according to an exemplary embodiment of the present invention.

FIG. 2 is a block diagram of a lamp for a camera-attachable streetlight according to an exemplary embodiment of the present invention. Referring to FIG. 2, a lamp, i.e. a camera-integrated lamp 12 for the surveillance camera-attachable streetlight includes, in its outside, a case 122 having a reflection surface on its bottom surface and a protectively transparent or partially semitransparent cover 12. In its inside, the camera-integrated lamp 12 includes a camera-integrated bulb module 120 connected to a socket 126. As a camera operates in the cover 124, the cover 124 is transparent to enable photographing or partially transparent only for a camera installation area.

The camera-integrated bulb module 120 has a typical bulb 1202 and a camera module 1210 in a single module. A connector 1205 for power connection has the same exterior configuration as a typical commercial connector inserted into the typical commercial socket 126, which is designed to receive commercial power. A power distributor 1204 distributes the power received through the connector 1210 to the bulb 1202 and the camera module 1210 so that they can operate independently. The camera module 1210 is provided with a camera 1218 for capturing a predetermined area and a wireless transceiver 1216 for wirelessly transmitting captured data received from the camera 1218.

As described above, the camera-integrated bulb module 120 according to the present invention can be inserted into the socket 126 in the same manner as a typical bulb inserted into a streetlight. Hence, the camera-integrated bulb module 120 is easily installed without an additional mechanical device for attaching a camera.

Figure 3A:
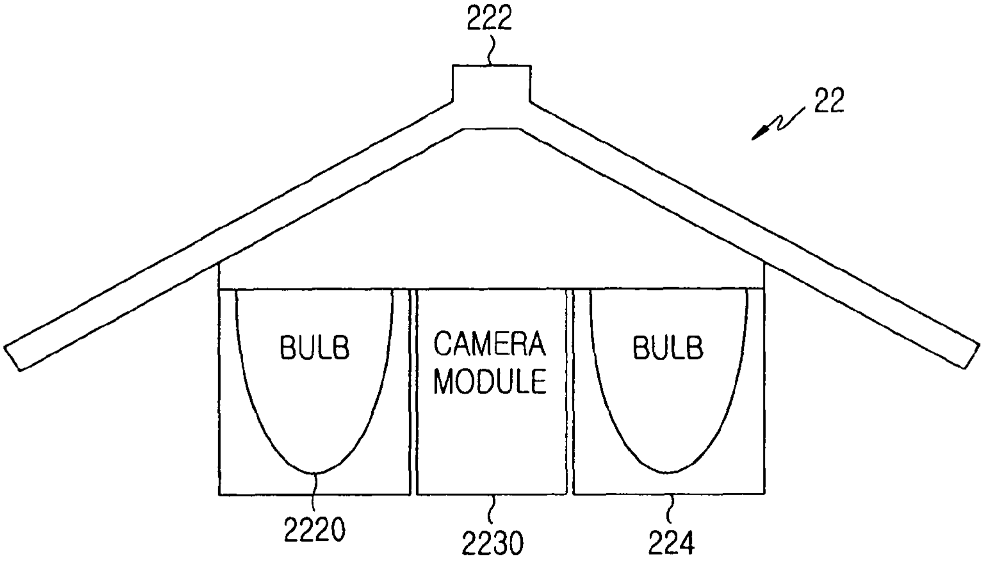
FIGS. 3A and 3B illustrate a lamp for a camera-attachable streetlight according to another exemplary embodiment of the present invention.
Figure 3B:
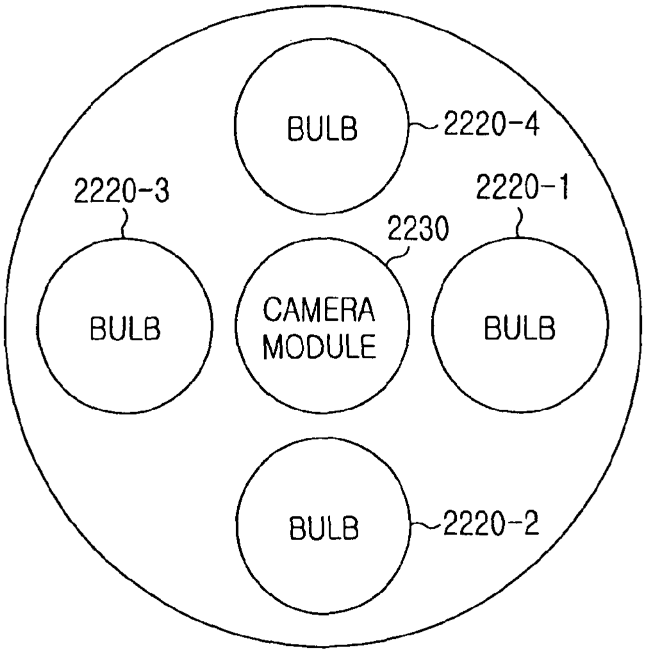

FIGS. 3A and 3B illustrate a lamp for a camera-attachable streetlight according to another exemplary embodiment of the present invention. FIG. 3B is a plan view of a bulb module illustrated in FIG. 3A.

Referring to FIGS. 3A and 3B, a camera-integrated lamp 22 of the present invention is provided, in the outside thereof, with a case 222 having a reflection surface at its bottom surface and a protectively transparent or partially semitransparent cover 224. The camera-integrated lamp 22 is provided, in the inside thereof, with a plurality of, for example, four bulbs 2220-1 to 2220-4. A camera module 2230 can be disposed at the center of the four bulbs 2220-1 to 2220-4.

The four bulbs 2220-1 to 2220-4 are formed integrally with the camera module 2230, thus forming a camera-integrated bulb module. This camera-integrated bulb module may have a connector for power connection that has the same exterior configuration as a typical connector inserted into a typical socket, for the power connection purpose. A power distributor is configured so as to distribute power received through the connector to the four bulbs 2220-1 to 2220-4 and the camera module 2230. The cover 224 may be shaped like a donut so that it covers the four bulbs 2220-1 to 2220-4, exposing the camera module 2230 at the center.

Figure 4A:
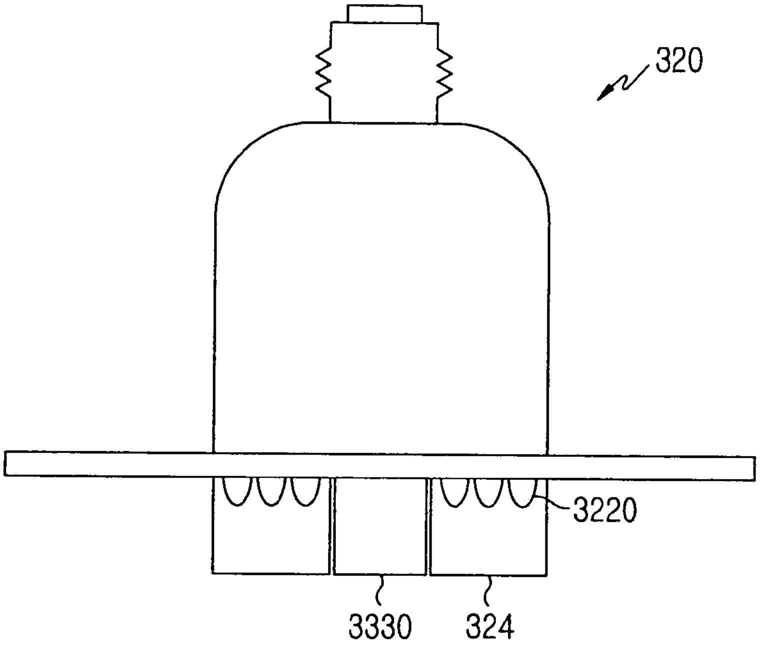
FIGS. 4A and 4B illustrate a lamp for a camera-attachable streetlight according to a third exemplary embodiment of the present invention.
Figure 4B:
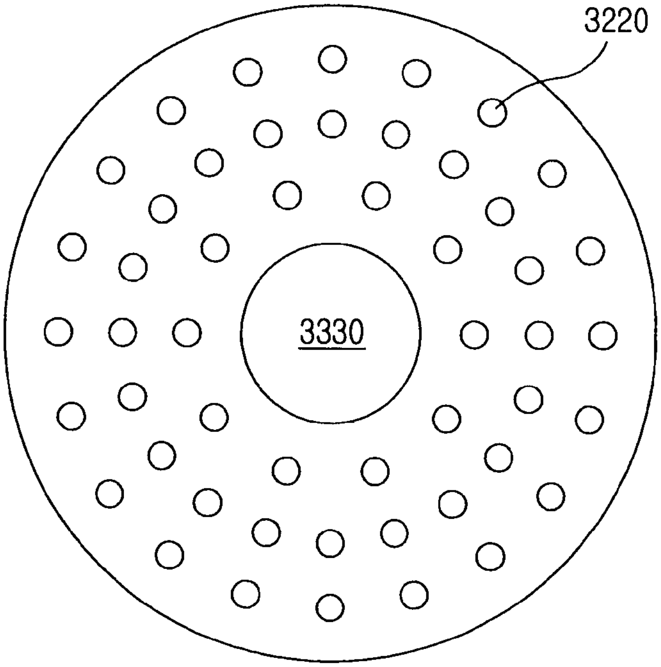

FIGS. 4A and 4B illustrate a lamp for a camera-attachable streetlight according to a third exemplary embodiment of the present invention. In FIGS. 4A and 4B, Light Emitting Diodes (LEDs) are applied to the streetlight lamp. Specifically, FIG. 4A illustrates a camera-integrated bulb module 320 and FIG. 4B is a plan view of a plurality of bulbs 3220 and a camera module 3330 in the camera-integrated bulb module 320 illustrated in FIG. 4A.

Referring to FIGS. 4A and 4B, the camera-integrated bulb module 320 may have a protectively transparent or partially semitransparent cover 324. For example, multiple LED lighting bulbs 3220 can be densely installed in the cover 324. The LED lighting bulbs 3220 can be the same as typical lighting LED bulbs in their structure. According to the present invention, the camera module 3330 can be installed at the center of the LED lighting bulbs 3220. A power distributor is configured so as to distribute power received through a connector to the LED lighting bulbs 3220 and the camera module 3330.

As is apparent from the above description, a lamp structure for a surveillance camera-attachable streetlight according to the present invention does not need an additional attachment device for attaching a surveillance camera body to the streetlight and a power cable for supplying a commercial power provided to the streetlight as an operation power to the surveillance camera. Therefore, the surveillance camera can be easily installed to the streetlight without modifying the structure of the streetlight.

While the invention has been shown and described with reference to certain exemplary embodiments of the present invention thereof, they are mere exemplary applications. For example, the number and positions of bulbs and the installation of a camera module may vary. Also, while it has been described that the camera module communicates wirelessly with a local server, it can communicate with the local module by cable.

In addition, the wireless camera module can transmit data captured from a predetermined area to the local server in real time, or can temporarily store the captured data in an internal memory and then transmit them to the local server at predetermined intervals (or at predetermined time points).

The wireless camera module can be configured to act like a general mobile communication terminal so that the wireless transceiver of the wireless camera module transmits image data like a mobile communication service signal. That is, phone numbers are allocated to the camera module and the local server, for individual identification and thus a video communication channel can be established between the camera module and the local server over a mobile communication network. The local server can be implemented in a Base Station (BS) or a Base Station Controller (BSC) in a typical mobile communication system and the central server can also be realized over the mobile communication network. In this case, the wireless camera module can transmit image data in early morning hours during which a smaller number of calls are made over the mobile communication network.

Therefore, it will be understood by those skilled in the art that various changes in form and details may be made therein without departing from the spirit and scope of the present invention as defined by the appended claims and their equivalents.

What is claimed is:

1. A lamp for a camera-attachable streetlight, comprising:

a camera-integrated bulb module that comprises:

a bulb portion;

a camera module having a camera for capturing a predetermined area and a transceiver for transmitting data captured by the camera to an external server;

a connector for connecting to an electrical power source, for receiving electrical power; and a power distributor for distributing the power received through the connector to the bulb portion and the camera module, a plurality of remote terminals for viewing the captured data, wherein an identification number of a mobile communication network is allocated to the camera module for individual identification, temporarily stores the captured data and transmits the captured data to the external server via the mobile communication network, a case having a reflection surface on a bottom surface and a cover being one of protectively transparent and semi-transparent, wherein the case and the cover are outside the lamp and the camera-integrated bulb module is inside the lamp;

wherein the camera is installed at the center of the case, and the cover has a portion enabling the camera capturing operation; and wherein the bulb portion, the connector, the camera module, and the power distributor are integrated together in the camera-integrated bulb module.

2. The lamp of claim 1, wherein the connector is configured so as to be inserted into a socket provided in the lamp.

3. The lamp of claim 1, wherein the bulb portion includes a plurality of bulbs and the camera module is installed at the center of the plurality of bulbs.

4. The lamp of claim 1, wherein the bulb portion includes a plurality of Light Emitting Diode (LED) lighting bulbs and the camera module is installed at the center of the plurality of LED lighting bulbs.

5. The lamp of claim 1, wherein the camera module operates in a visible light range.

6. The lamp of claim 1, wherein the transceiver communicates with the server by cable or wirelessly.

7. The lamp of claim 1, wherein the camera module transmits the captured data in a signal of a mobile communication network.

8. The lamp of claim 1, wherein the bulb portion includes a plurality of bulbs and the camera module is installed at the center of the plurality of bulbs.

9. The lamp of claim 2, wherein the bulb portion includes a plurality of bulbs and the camera module is installed at the center of the plurality of bulbs.

10. The lamp of claim 1, wherein the bulb portion includes a plurality of Light Emitting Diode (LED) lighting bulbs and the camera module is installed at the center of the plurality of LED lighting bulbs.

11. The lamp of claim 2, wherein the bulb portion includes a plurality of Light Emitting Diode (LED) lighting bulbs and the camera module is installed at the center of the plurality of LED lighting bulbs.

12. The lamp of claim 1, wherein the camera module operates in a visible light range.

13. The lamp of claim 2, wherein the camera module operates in a visible light range.

14. The lamp of claim 2, wherein the camera module externally transmits the captured data in real time, or temporarily stores the captured data in an internal memory and externally transmits the captured data at a predetermined time.

15. The lamp of claim 1, wherein the camera module transmits the captured data in a signal of a mobile communication network.

16. The lamp of claim 2, wherein the camera module transmits the captured data in a signal of a mobile communication network.

* * * * *